(12) United States Patent
Colley

(10) Patent No.: US 10,838,513 B2
(45) Date of Patent: Nov. 17, 2020

(54) RESPONDING TO SELECTION OF A DISPLAYED CHARACTER STRING

(75) Inventor: Ashley Colley, Oulu (FI)

(73) Assignee: Nokia Technologies Oy, Espoo (FI)

( * ) Notice: Subject to any disclaimer, the term of this patent is extended or adjusted under 35 U.S.C. 154(b) by 926 days.

(21) Appl. No.: 13/567,554

(22) Filed: Aug. 6, 2012

(65) Prior Publication Data

US 2014/0040733 A1 Feb. 6, 2014

(51) Int. Cl.
*G06F 3/023* (2006.01)
*G06F 40/166* (2020.01)
*G06F 40/232* (2020.01)
*G06F 40/274* (2020.01)
*G06F 3/0488* (2013.01)

(52) U.S. Cl.
CPC .......... *G06F 3/0237* (2013.01); *G06F 3/0236* (2013.01); *G06F 3/04883* (2013.01); *G06F 3/04886* (2013.01); *G06F 40/166* (2020.01); *G06F 40/232* (2020.01); *G06F 40/274* (2020.01); *G06F 2201/00* (2013.01); *G06F 2201/80* (2013.01); *G06F 2201/805* (2013.01)

(58) Field of Classification Search
CPC ...... G06F 17/237; G06F 17/24; G06F 17/276; G06F 40/166; G06F 40/232; G06F 40/274; G06F 3/0236; G06F 3/0237; G06F 3/04883; G06F 3/04886; G06F 2201/00; G06F 2201/80; G06F 2201/805
USPC ................. 715/229, 255–256, 257
See application file for complete search history.

(56) References Cited

U.S. PATENT DOCUMENTS

| 7,155,683 | B1* | 12/2006 | Williams | G06F 3/0237 715/739 |
| 9,015,036 | B2* | 4/2015 | Karov Zangvil | G06F 17/276 715/257 |
| 2006/0206816 | A1* | 9/2006 | Nordenhake | 715/534 |
| 2007/0260981 | A1* | 11/2007 | Kim et al. | 715/531 |
| 2007/0273648 | A1* | 11/2007 | Fussinger | G06F 1/1626 345/161 |
| 2009/0182552 | A1* | 7/2009 | Fyke et al. | 704/9 |
| 2009/0225041 | A1* | 9/2009 | Kida | G06F 3/04886 345/173 |
| 2010/0161733 | A1* | 6/2010 | Bower et al. | 709/206 |
| 2010/0287486 | A1 | 11/2010 | Coddington | |
| 2010/0292984 | A1* | 11/2010 | Huang | G06F 17/276 704/9 |

(Continued)

FOREIGN PATENT DOCUMENTS

EP   2 133 869 A2   12/2009
WO   WO-2007012923 A1 *  2/2007  .......... G06F 3/0237

OTHER PUBLICATIONS

Ziebart et al., "Probabilistic Pointing Target Prediction via Inverse Optimal Control", Feb. 14-17, 2012, Lsbon, Portugal, Copyright 2012 ACM 978-1-4503-1048, pp. 10.*

(Continued)

*Primary Examiner* — Chau T Nguyen
(74) *Attorney, Agent, or Firm* — Alston & Bird LLP

(57) ABSTRACT

A method comprises causing a character string to be displayed on a display, receiving a signal indicative of user input for selecting the displayed character string, and responding to the signal by using a language engine to predict a location within the selected character string for modification of the selected character string.

30 Claims, 11 Drawing Sheets

(56) References Cited

U.S. PATENT DOCUMENTS

2013/0120267 A1* 5/2013 Pasquero et al. ............ 345/168
2013/0253906 A1* 9/2013 Archer ................. G06F 17/276
　　　　　　　　　　　　　　　　　　　　　　704/9

OTHER PUBLICATIONS

European Search Report for Application No. EP 13 17 9377 dated Jun. 18, 2014.
Check spelling and grammar [online] [retrieved May 15, 2015]. Retrieved from the Internet: <URL: https://support.office.com/en-in/article/Check-spelling-and-grammar-5cdeced7-d81d-47de-9096-efd0ee909227>. (Jun. 15, 2010) 11 pages.
Office Action for corresponding European Application No. 13179377.0 dated Jun. 2, 2015.

* cited by examiner

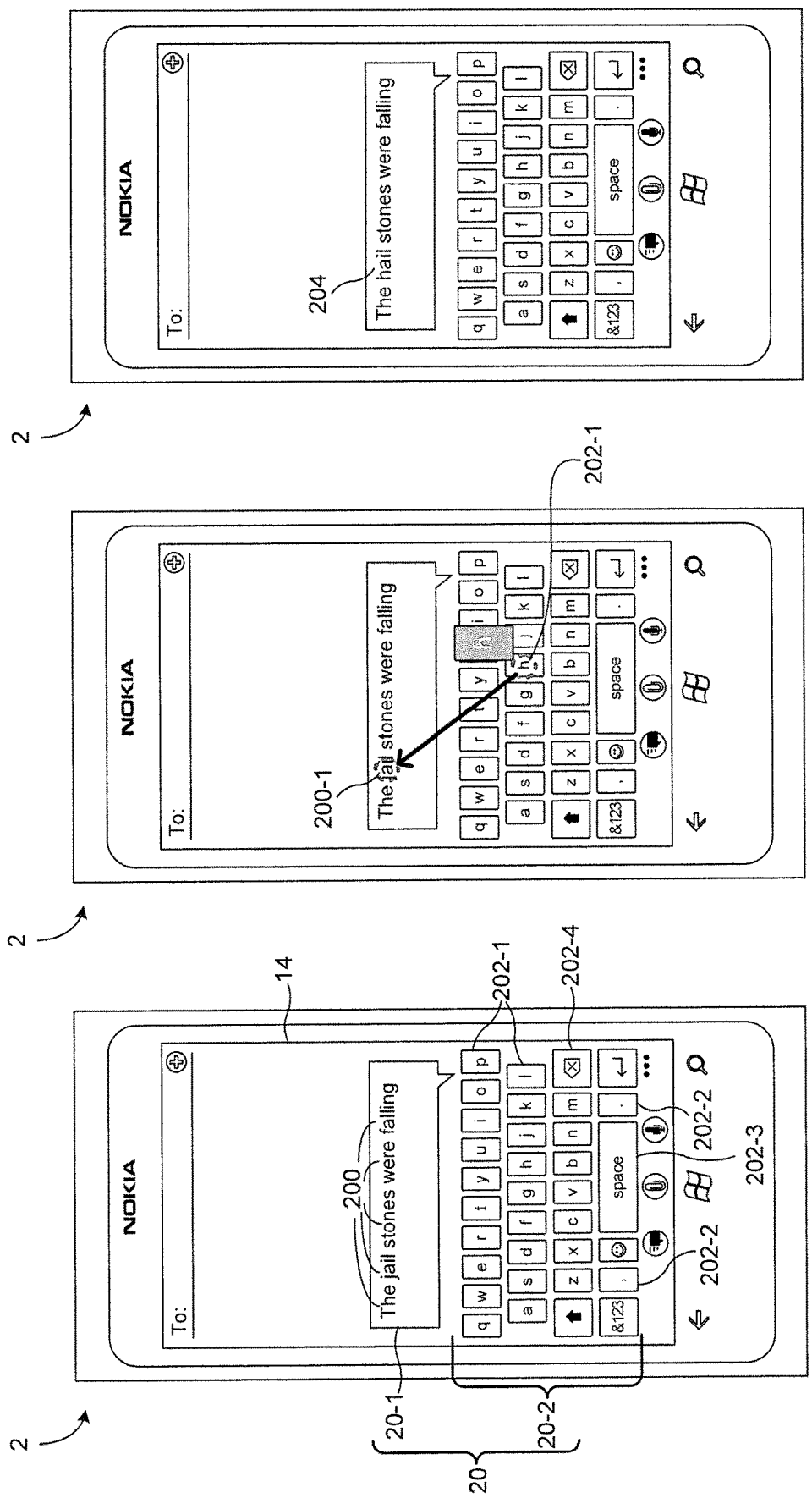

RESPONDING TO SELECTION OF A DISPLAYED CHARACTER STRING

FIELD

This invention relates to responding to selection of a displayed character string.

BACKGROUND

There a many different mechanisms for enabling users to enter text into electronic devices. These include mechanical and virtual keyboards. Small devices, such as mobile telephones, commonly have small keyboards.

SUMMARY

In a first aspect, this specification describes a method comprising causing a character string to be displayed on a display, receiving a signal indicative of user input for selecting the displayed character string, and responding to the signal by using a language engine to predict a location within the selected character string for modification of the selected character string.

The method may comprise using the language engine to predict the location for modification of the selected character string based on the selected character string and a location of the user input within the selected character string.

The method may comprise receiving a signal indicative of user input in respect of a selection of a text editing option. The user input for selecting the displayed character string may comprise a dynamic touch input which identifies both a location of an object representing the selected text editing option and the selected character string.

Using the language engine to predict the location may comprise identifying a replacement character string based on the selected character string and the selected text editing option, wherein the replacement character string is a version of the selected character string that is modified at the predicted location based on the selected text editing option.

The method may comprise subsequently causing the selected character string to be replaced on the display by the replacement character string.

Alternatively, predicting the location for modification may comprise identifying plural different replacement character strings based on the selected character string and the selected text editing option, each of the different replacement strings being a version of the selected character string that is modified at a different location based on the selected text editing option. The method may further comprise activating a mechanism for allowing the user to select one of the plural replacement character strings, and responding to selection of one of the replacement character strings by causing the selected displayed character string to be replaced on the display by the selected replacement character string.

The selected text editing option may be a text character. Each replacement character string may be modified by inserting the selected text character into the selected displayed character string at a predicted location. Each replacement character string may be modified also by removing a character from the string.

The selected text editing option may be a character removal option. Each identified replacement character string may be modified by removing a text character from the predicted location in the selected displayed character string.

The method may comprise, subsequent to predicting the location for modification, positioning a cursor within the selected character string based on the predicted location.

The displayed character string may be a correctly spelled word.

In a second aspect, this specification describes apparatus comprising at least one processor and at least one memory including computer program code, the at least one memory and the computer program code configured to, with the at least one processor, cause the apparatus to cause a character string to be displayed on a display, to receive a signal indicative of user input for selecting the displayed character string and to respond to the signal by using a language engine to predict a location within the selected character string for modification of the selected character string.

The at least one memory and the computer program code may be configured, with the at least one processor, to cause the apparatus to use the language engine to predict the location for modification of the selected character string based on the selected character string and a location of the user input within the selected character string.

The at least one memory and the computer program code may be configured, with the at least one processor, to cause the apparatus receive a signal indicative of user input in respect of a selection of a text editing option.

The user input for selecting the displayed character string may comprise a dynamic touch input which identifies a location of an object representing the selected text editing option and the selected character string.

The at least one memory and the computer program code may be configured, with the at least one processor, to cause the apparatus, to use the language engine to predict the location by identifying a replacement character string based on the selected character string and the selected text editing option, wherein the replacement character string is a version of the selected character string that is modified at the predicted location based on the selected text editing option. The at least one memory and the computer program code may be configured, with the at least one processor, to cause the apparatus subsequently to cause the selected character string to be replaced on the display by the replacement character string.

Alternatively, the at least one memory and the computer program code may be configured, with the at least one processor, to cause the apparatus to predict the location for modification by identifying plural different replacement character strings based on the selected character string and the selected text editing option, each of the different replacement strings being a version of the selected character string that is modified at a different location based on the selected text editing option. The at least one memory and the computer program code may be configured, with the at least one processor, to cause the apparatus to activate a mechanism for allowing the user to select one of the plural replacement character strings, and to respond to selection of one of the replacement character strings by causing the selected displayed character string to be replaced on the display by the selected replacement character string.

The selected text editing option may be a text character. The or each replacement character string may modified by inserting the selected text character into the selected displayed character string at a predicted location. Each replacement character string may be modified also by removing a character from the string.

The selected text editing option may be a character removal option. The or each identified replacement character string may be modified by removing a text character from the predicted location in the selected displayed character string.

In some examples, the at least one memory and the computer program code may be configured, with the at least one processor, to cause the apparatus, subsequent to predicting the location for modification, to position a cursor within the selected character string based on the predicted location.

In a third aspect, this specification describes computer-readable code which, when executed by computing apparatus, causes the computing apparatus to perform a method according to the first aspect.

In a fourth aspect, this specification describes at least one non-transitory computer readable memory medium having computer readable instructions stored thereon, the computer readable instructions, when executed by at least one processor, causing the at least one processor to cause a character string to be displayed on a display, to receive a signal indicative of user input for selecting the displayed character string, and to respond to the signal by using a language engine to predict a location within the selected character string for modification of the selected character string.

In a fifth aspect, this specification describes apparatus comprising means for causing a character string to be displayed on a display, means for receiving a signal indicative of user input for selecting the displayed character string, and means for responding to the signal by using a language engine to predict a location within the selected character string for modification of the selected character string.

BRIEF DESCRIPTION OF THE FIGURES

For a more complete understanding of example embodiments, reference is now made to the following description taken in connection with the accompanying drawings in which:

FIGS. 2A to 2C illustrate a first aspect of an operation according to example embodiments;

DETAILED DESCRIPTION OF EXAMPLE EMBODIMENTS

Figure 1:
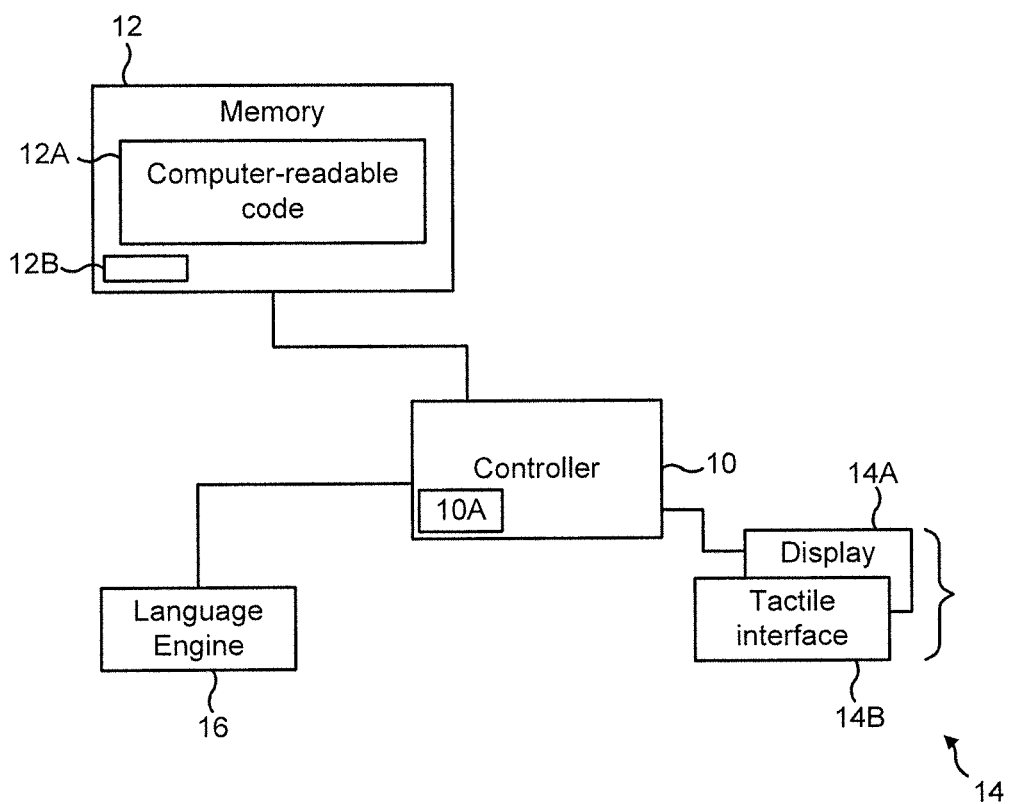
FIG. 1 is a schematic apparatus according to example embodiments.

In the description and drawings, like reference numerals refer to like elements throughout.

FIG. 1 is an apparatus 1 according to example embodiments. The apparatus 1 comprises a controller 10 and at least one non-transitory memory medium 12. The apparatus also comprises a user interface 14 and a language engine 16.

The controller 10 comprises at least one processor 10A which is operable to execute computer readable code 12A stored in the at least one memory 12. The controller 10 is operable, under the control of the computer readable code 12A to control the other components of the apparatus 1. The at least one processor 10A may comprise any suitable type, or any combination of suitable types, of processor or microprocessor. The controller 10 may also comprise one or more application specific integrated circuits (not shown). The at least one memory 12 may comprise any suitable type, or any combination of suitable types of memory medium. Suitable types of memory medium include, but are not limited to ROM, RAM and flash memory.

In this example the user interface 14 comprises a display 14A which is operable under the control of the controller 10, to output images, made up of pixels, to a user of the apparatus 1. The user interface 14 also comprises a user input interface 14B, which is operable receive user inputs and to send signals indicative of such to the controller 10. In this example, the user input interface 14B comprises a touch interface which is operable to detect touch inputs provided thereon. The touch interface 14B is located directly over the display 14A. In other words, in this example, the user interface 14 is a touchscreen. It will be appreciated, however, that in some examples, the user input interface 14B may be of a different type, such as but not limited to mechanical keys and a scroll wheel, a track ball or a mouse.

Also, stored in the memory 12 is a text editing application 12B. This application 12B, when executed, allows the user of the apparatus 1 to enter text via the user input interface 14B for display on the display 14. In the case of touch screen apparatuses 1 such as that of FIG. 1, the text may be entered via a virtual keyboard displayed on the display 14A. Alternatively, the text may be entered using another type of interface such as a voice recognition interface. The application 12B also allows the user to edit existing text using the user input interface 14. The existing text may have been provided to the apparatus 1 in any suitable way, for example, via a virtual keyboard, a mechanical keyboard, a voice interface or via transfer from another device. The text editing application 12B may be of any type, such as but not limited to an SMS or MMS application, a notepad application and an email application.

The language engine 16 is configured to analyse character strings entered by the user and to identify unrecognised character strings (e.g. incorrectly spelled words). The language engine 16 may utilise, for example, a database of recognised character strings (e.g. a dictionary), grammatical rules and/or n-gram tables. A number of different language engine 16 algorithms are known in the art, and these include Nuance's "xt9". The language engine 16 is further configured to identify replacement character strings based on an existing character string and a user-selected text entry option. This and other operations of the language engine 16 are described in greater detail below with reference to FIGS. 2A to 10. Although the language engine 16 has been depicted as a separate module to the controller 10 and the memory 12, it will be appreciated that the language engine 16 may simply comprise an application stored on the memory 12 and executed by the controller 10. Any associated databases (the dictionary etc.) may be stored on the memory 12.

The apparatus 1 may be part of an electronic device, such as but not limited to a mobile telephone, a personal digital assistant, a laptop computer, a tablet computer, a desktop computer, an e-reader, and a media player.

FIGS. 2A to 2C illustrate a text editing operation in accordance with example embodiments. In this example, the apparatus 1 is part of a portable device 2, specifically a mobile telephone.

In FIG. 2A, the graphical user interface (GUI) 20 of the text editing application 12A is displayed on the touchscreen 14 of the device 2. In this example, the text editing application 12B is an SMS application. The GUI 20 comprises a text display region 20-1 and a virtual keyboard 20-2.

A series of character strings 20 are displayed in the text display region 20-1. In this example, each of the character strings 20 constitutes a correctly spelled English language word. It will of course be appreciated that misspelled words, or "non-words", may be also be displayed as character strings 200 in the text display region 20-1.

The virtual keyboard 20-1 comprises a plurality of virtual keys 200. Each of the virtual keys may relate to a different function and, if selected, may result in a particular function being performed. Some of the virtual keys 200 may be referred to as text editing options. This is because, when selected, the text displayed in the text display region 20-1 is caused to be altered or edited. Some of these text editing options are text addition options as their selection results in an addition to the text. For example, when a text character key 202-1 (a, b, c etc) is selected, the associated character is caused to be displayed, when a punctuation key 202-2, 202-2 (comma, full stop etc) is selected, the associated punctuation mark is caused to be displayed and when the space key 202-3 is selected, a space is added to the text display region 20-1. Another type of text editing option is a character removal option. Selection of this type of option, such as a delete or backspace key 202-4, results in removal of a character from the text display region 20-1.

The series of words 200 displayed in the text display region 20-1 says "The jail stones were falling". This is the result of an error by the user who intended to type "hail" instead of "jail". However, the mistake was easy to make because the "h" and "j" keys are located beside one another on the virtual keyboard 20-2. Also, because "jail" is a real word, the language engine 16 did not recognise it as a mistake and so did not correct it automatically.

FIG. 2B illustrates an action performed by the user which according to example embodiments causes the mistake to be corrected. The user provides a user input in respect of the incorrect word 200-1. Specifically, the user provides a dynamic touch input which terminates at a location of the text display region 20-1 at which the incorrect word 200-1 is displayed. A dynamic touch input, which may also be referred to as a swipe input, comprises the user sliding their finger across the surface of the display screen 14A from a first, or starting, location to a second, or finishing, location.

In this example, the starting location of the dynamic touch input is a location at which a one of the text editing options 202-1 is displayed. In this example, the text editing option is a character key, specifically the "h" key. In some examples, an icon representing the text editing option may be moved or dragged across the display concurrently with the dynamic touch input.

In response to detecting this user input in respect of a one of the character strings 200, the controller 10 uses the language engine 16 to identify one or more replacement character strings for replacing the selected string. More specifically, the language engine 16 returns one or more replacement strings which are based on the displayed character string, but which are modified at a predicted location within the displayed string based on the selected text editing option. The predicted location may be the location of a single character or multiple consecutive characters. Alternatively, the predicted location may be a location between characters, a location immediately preceding the first character in the string or a location immediately following the last character in the string.

In the example of FIG. 2B, the selected text editing option is a text character key and so the language engine returns one or more replacement strings which are versions of the originally displayed character string, but which have been modified at a location within the string to include the selected character. In this example, the only English word based on the word "jail", which is modified at a location in the string to include the letter "h" is the word "hail". Consequently, the language engine 16 returns the replacement string "hail", which is modified by replacing the letter "j" with the letter "h". As the language engine 16 returned only one possible replacement string, the controller 10 automatically causes the originally displayed character string 200-1 (i.e. "jail") to be replaced by the replacement string (i.e. "hail") 204. This can be seen in FIG. 2C. If the language engine 16 had returned more than one possible replacement string, the correct string might be identified by any suitable approach. For example, the most likely string might be determined based on probabilistic information provided by the language model 16, or by querying the user to select one string from a plurality of possible replacement strings determined by the language engine 16.

Figure 3C:
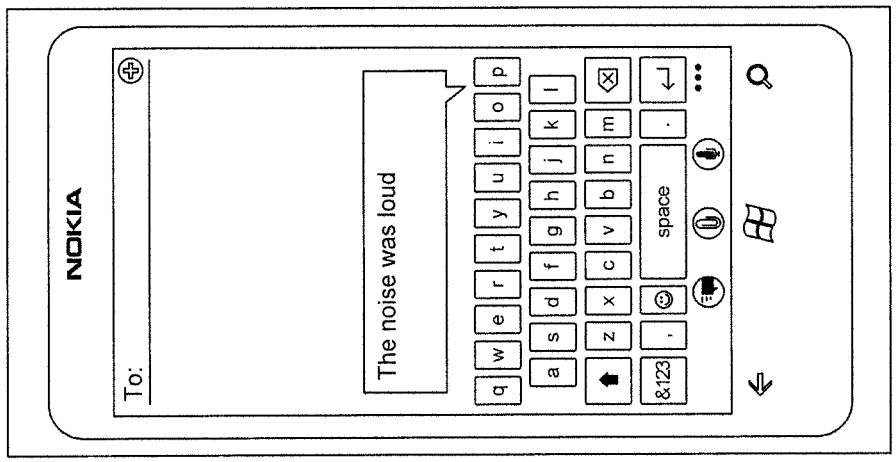
FIGS. 3A to 3C illustrate a second aspect of an operation according to example embodiments.
Figure 3B:
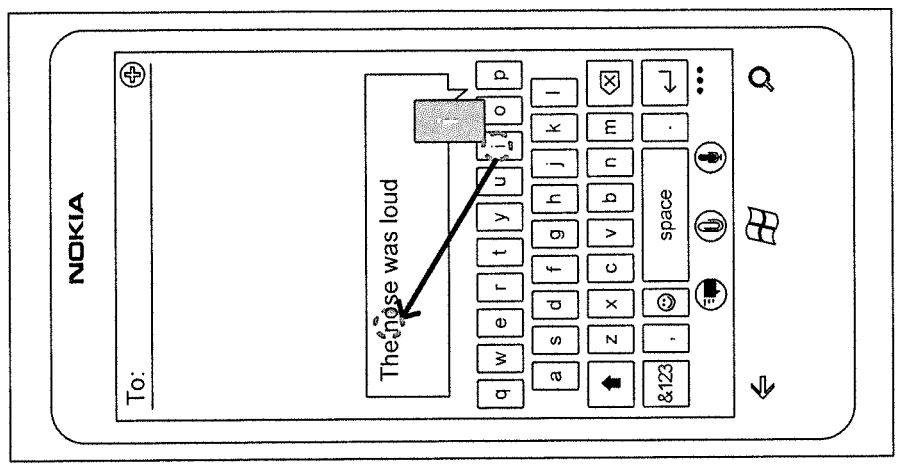
Figure 3A:
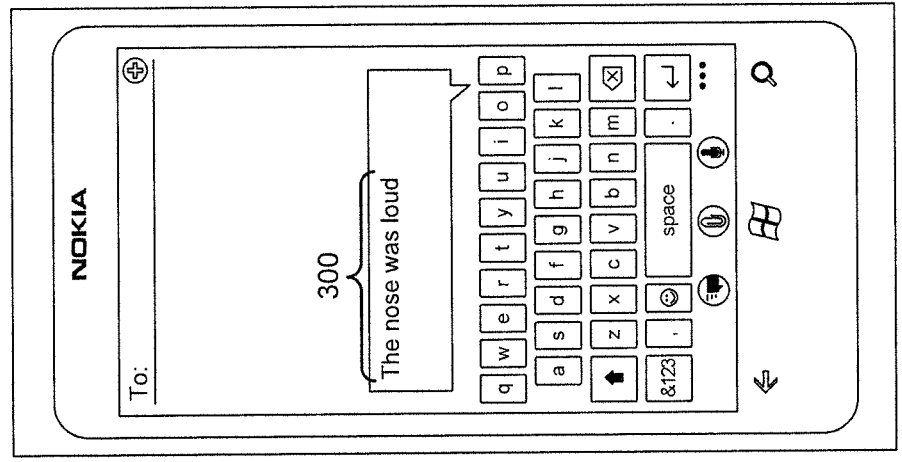

FIGS. 3A to 3C illustrate another aspect of the text editing operation in accordance with example embodiments.

In FIG. 3A, the text string 300 that is caused to be displayed on the text display region 20-1 says "The nose was loud". This is once again a user error. The user actually intended to enter the word "noise" instead of "nose". Consequently, in order to correct the mistake, in FIG. 3B, the user provides a dynamic touch input which starts at the desired text editing option (in this instance, the text character "i") and finishing at the incorrect character string (i.e. the word "nose").

In response to the user input, the controller 10 uses the language engine 16 to identify at least one replacement string. As before, each replacement character string is a version of the character string selected by the dynamic touch input which is modified at a predicted location in accordance with the selected text editing option. In this example, the text editing option is once again a text character. Consequently, the language engine 16 returns all replacement character strings which are modified versions of the displayed character string, but which include the selected character at a predicted location within the displayed character string. In this example, there is only one way in which the originally displayed character string, "nose", can be modified to include the selected character "i", and that is by inserting the selected character to produce the replacement character string "noise". The predicted location is thus between the second and third characters of the string. In FIG. 3C, the originally displayed character string ("nose") is replaced in the text display region 20-1 with the replacement character string ("noise").

Figure 4C:
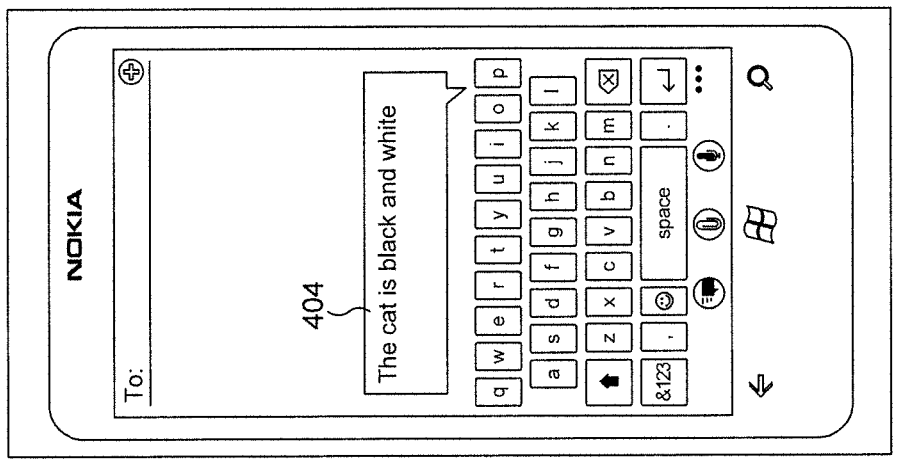
FIGS. 4A to 4C illustrate a third aspect of an operation according to example embodiments.
Figure 4B:
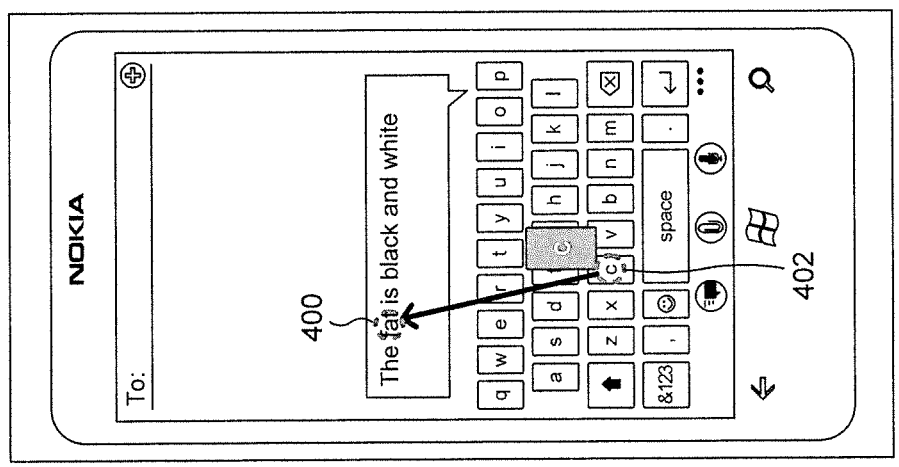
Figure 4A:
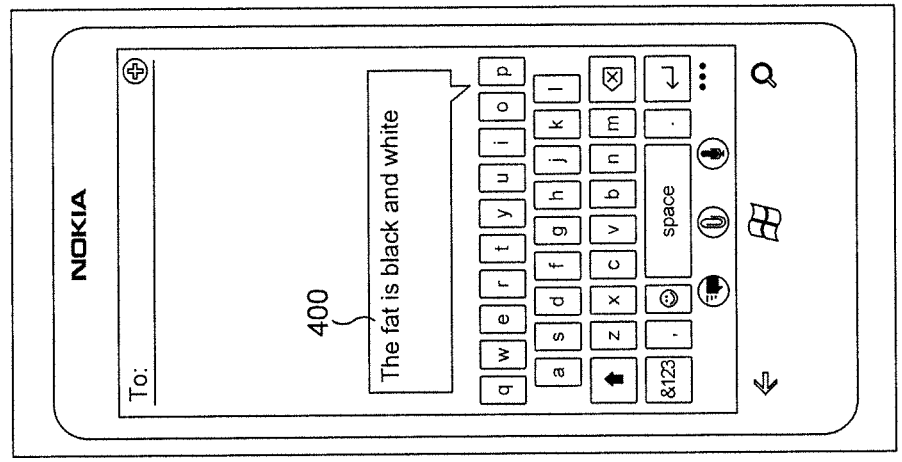

FIGS. 4A to 4C illustrate another aspect, in which a text character 402, in this case "c", is dragged onto a displayed character string 400, in this case "fat". In this example, there are two ways in which the selected character string 400 can be modified to include the selected character 402. Specifically, the word "cat" can be produced by replacing the letter "f" with the letter "c", or the word "fact" can be produced by inserting the letter "c" at a particular location of the selected character string.

In this example, the language engine 16 is configured so as to prioritise one type of modification over another. Specifically, in this example, the language engine 16 is configured to prioritise modification of the selected string by replacement of a character over modification of the selected string by mere insertion of a character. It is more common for users to enter incorrect characters than to omit characters altogether. As such, it is more common for a correction by replacement than by simple insertion to be required. Thus, by prioritising in this way, the language engine 16 may be more likely to return the desired replacement character string. In such examples, the language engine 16 returns only the replacement character strings which are modified in the prioritised manner. As a result of the prioritisation, in FIG. 4C, the controller 10 has caused the selected character string "fat" 400 to be replaced by the replacement character string "cat" 404.

In other examples, the modification types might be differently prioritised, or not prioritised at all. For example, the language engine 16 may alternatively be configured to prioritise modification by simple insertion over modification by replacement. In other examples, the language engine 16 may be configured to analyse the context in which selected character string resides and subsequently to select the replacement character string for display based on the context. In other examples, the language engine 16 may be configured to prioritise words that are more commonly used in the particular language. In other examples, a set of possible corrections will be presented to the user to select between—for example a set of possible corrections that will result in known words and/or will result in words that match certain n-gram-based heuristics; in such examples the user might select by touching a representation of the desired correction, for example. It will be understood also that the language engine 16 may take a number of the above considerations into account when selecting one of a plurality of the replacement strings to return for display.

Figure 5C:
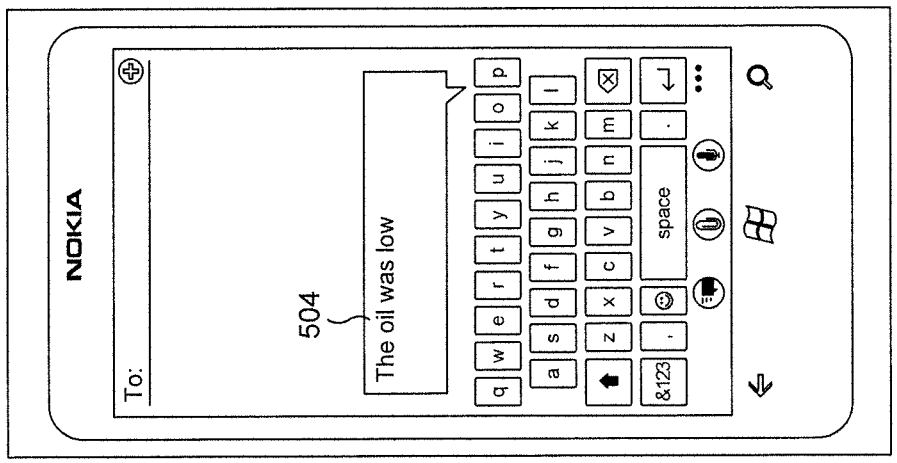
FIGS. 5A to 5C illustrate a fourth aspect of an operation according to example embodiments.
Figure 5B:
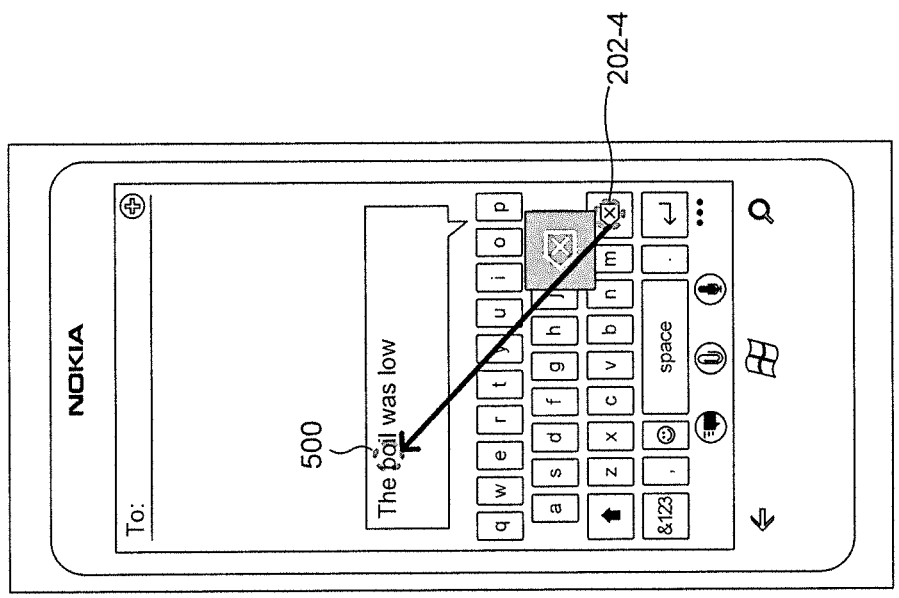
Figure 5A:
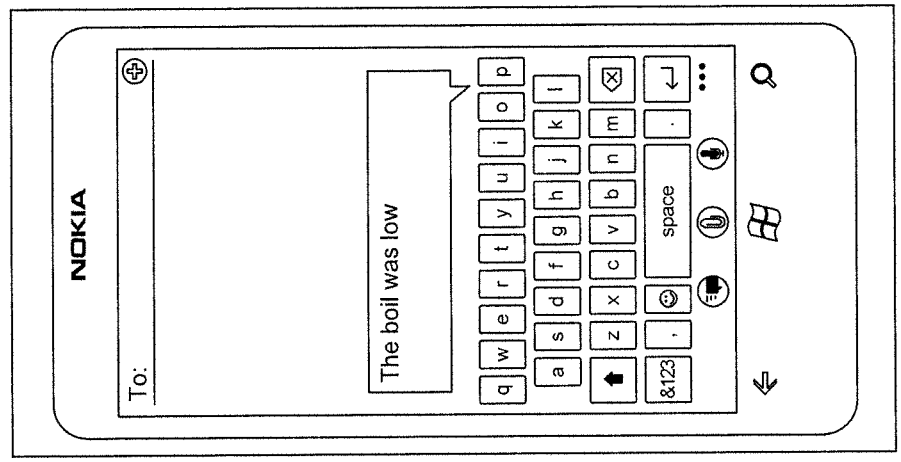

FIGS. 5A to 5C illustrate an example in which a different type of text editing option is used to identify the replacement character string. In this example, selected text editing option is a character removal option, specifically the backspace key. When a character removal option is selected, the language engine 16 identifies and returns replacement character strings that are modified by removing one or more characters. In this example, the selected character string 500 is "boil" and there is only one way in which it can be modified by removing a character from a particular location to arrive at a valid (or correctly spelled) character string. Consequently, the language engine 16 returns the replacement character string 504 "oil" which is a version of the selected character string 500 that has been modified at a particular location in accordance with the selected text editing option 502 (in this instance a character removal option). In FIG. 5C, the returned replacement character string 504 is caused to be displayed in place of the selected character string 500.

Although not illustrated herein, in some examples, dragging the space key onto a displayed character string may cause a space to be inserted into the displayed character string, thereby splitting selected character string into two separate character strings. This may be useful where two words have been accidentally combined into a single character string. In some examples, applying a dynamic touch input starting at the "shift" key and ending on a displayed character string may cause a character at a location in the string to be capitalised. This may be useful, for example, where the character string is a name that also has another meaning, such as "Mark". In some instances, for example in which one common use of a character string is as an acronym (e.g. "led"), dragging the shift key onto the word may cause the whole word to be capitalised. In other examples, dragging the shift key onto a word twice in succession may result in the whole word being capitalised. It will of course be appreciated that icons representing other functions, such as bold, italics and underline, may be dragged onto displayed text strings so as to cause them to be modified in accordance with the selected function.

Figure 6C:
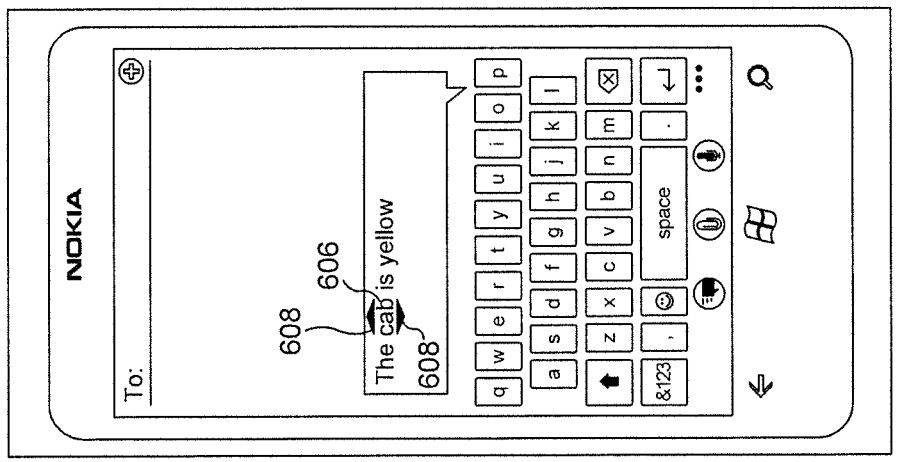
FIGS. 6A to 6C illustrate a fifth aspect of an operation according to example embodiments.
Figure 6B:
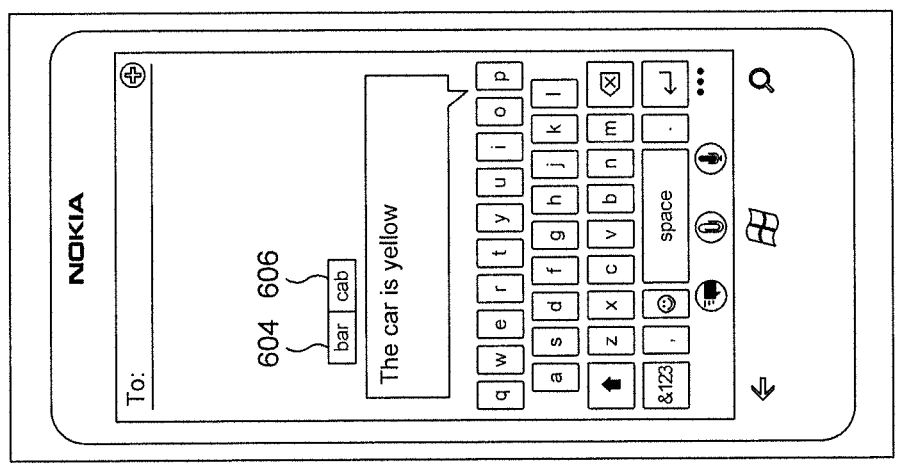
Figure 6A:
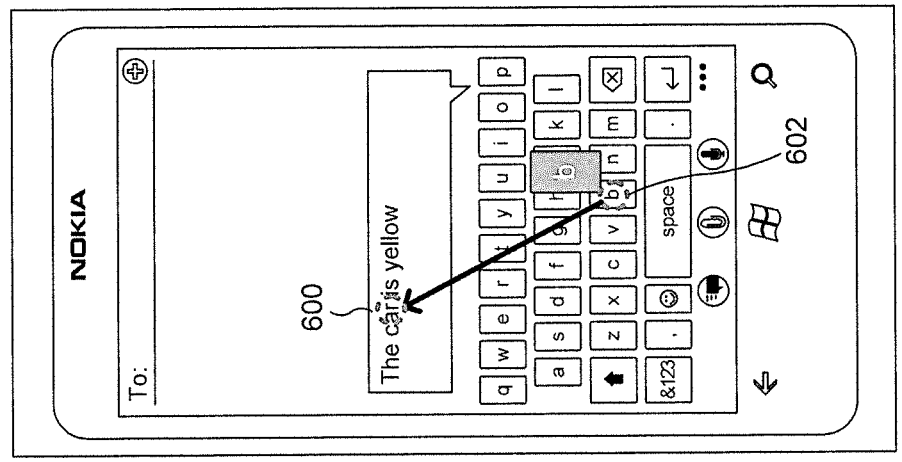

FIGS. 6A to 6C illustrate other aspects of example embodiments. In these aspects, the apparatus is configured to allow the user to select between plural replacement character strings returned by the language engine 16. In FIG. 6A, the user provides a dynamic touch input starting from the text character icon "b" 62 and finishing at the character string "car" 60. The controller 10 responds to this by using the language engine 16 to identify one or more replacement character strings. In this instance, there are two different ways in which the selected character string ("car") can be modified to include the selected text character ("b"). Both the possible replacement character strings, "bar" and "car", are modifications of the displayed character string by replacement, and so they may both have the same priority. As such, in FIG. 6B, the controller 10 causes both replacement character strings 604, 606 to be displayed on the display. Each of these is selectable, such that if a user input is provided on a location at which a replacement character string is provided, the selected replacement character string is caused to replace the originally displayed character string on the display 14A.

FIG. 6C shows an alternative to the example of FIG. 6B in which one of the plural replacement character strings is initially caused to replace the originally displayed character string 600. However, the controller 10 also activates a mechanism for allowing the user to scroll through the other replacement character strings. In FIG. 6C this is carried out by providing virtual scroll keys 608 on the display. Selection of these causes the next replacement character string to replace the previously displayed replacement character string 606 on the display. The replacement character string that is initially displayed may be selected based on the context of the surrounding words. Alternatively, words that are more commonly used in the particular language may take priority and so may be displayed first. In other examples, any suitable rule or algorithm, such as alphabetical order or even a random selection, may be used to determine which replacement character string should be displayed first.

It will, of course, be appreciated that in some examples all possible replacement character strings may be provided to the user as described in the examples of FIGS. 6A to 6C, regardless of whether they are modifications by replacement or insertion.

FIGS. 7A to 7D illustrate another aspect of example embodiments. In these examples, the apparatus 1 is configured to identify the replacement character string for display based on the selected text entry option 60 and a location of the touch input within the displayed character string 62. The location of the touch input does not need be exact but may instead indicate an approximate location within the displayed character string. For example, in FIG. 7A, a user has provided a dynamic touch input from the icon 70 representing the character "b" to an end part of the originally displayed character string 72. The controller 10 is configured to identify this approximate location within the character string and the language engine 16 uses this identified location to identify replacement character strings which include the selected text character in the part of the selected string 72 indicated by the location of the touch input. The controller 10 may split the character strings up into a plurality of sub-portions, for example the first half and the second half of the string. The language engine 16 may then identify only replacement character strings in which the modification with selected text editing option occurs in the identified sub-portion of the displayed character string 72. In this case, the language engine 16 identifies the string "cab" 74 as being the only replacement character string in which the modification occurs in the second half of the string. Consequently, the controller 10 causes that string 74 to replace the originally displayed string 72. It will be understood that longer character strings may be separated into a greater number of sub-portions.

Figure 7A:
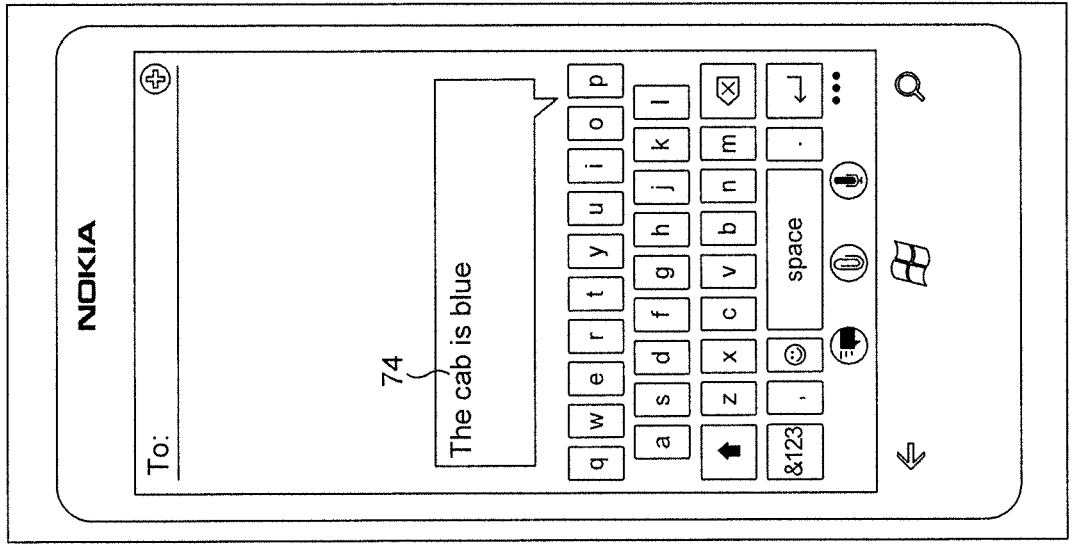
FIGS. 7A to 7D illustrate a sixth aspect of an operation according to example embodiments.
Figure 7B:
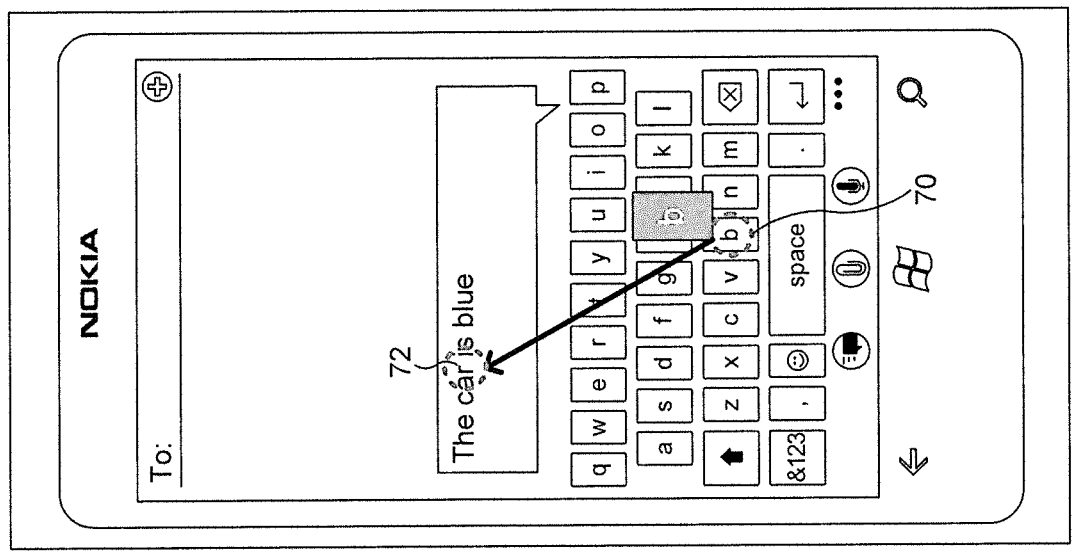
Figure 7C:
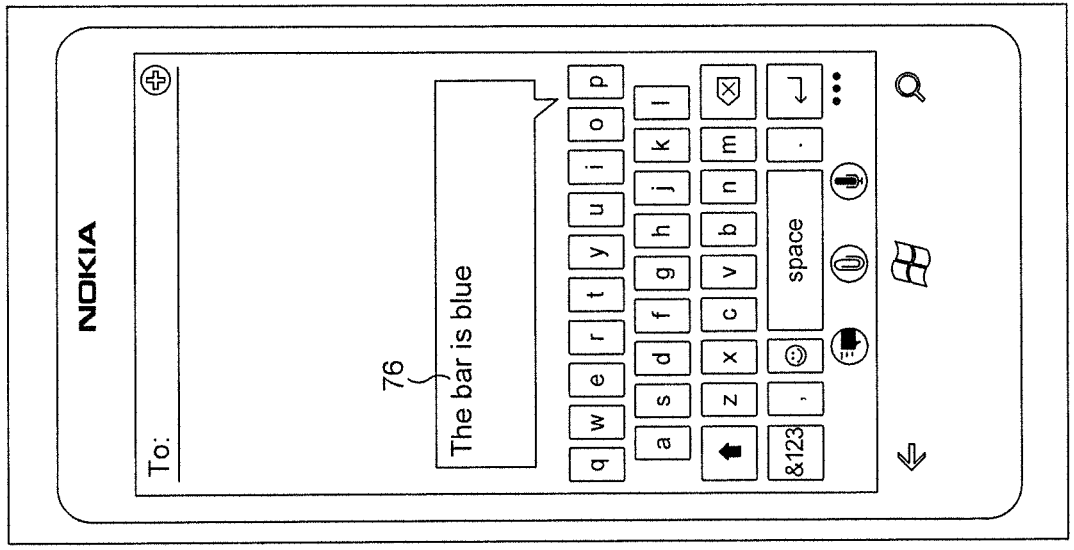
Figure 7D:
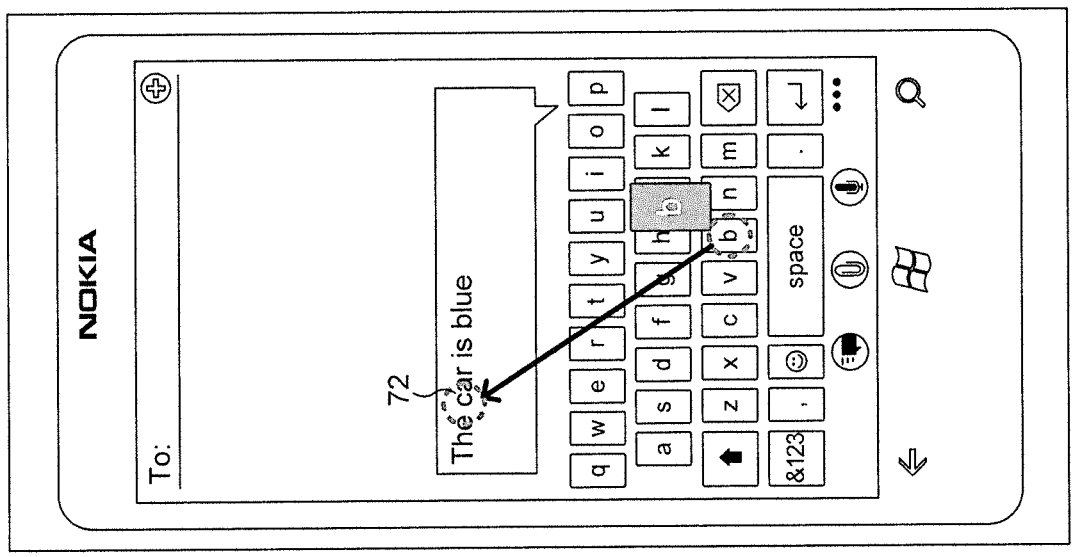

In FIG. 7C, the touch input terminates on the first half of the displayed character string and so the language engine 16 returns the replacement character string 76 ("bar") which is modified at the first half of the string.

Figure 8:
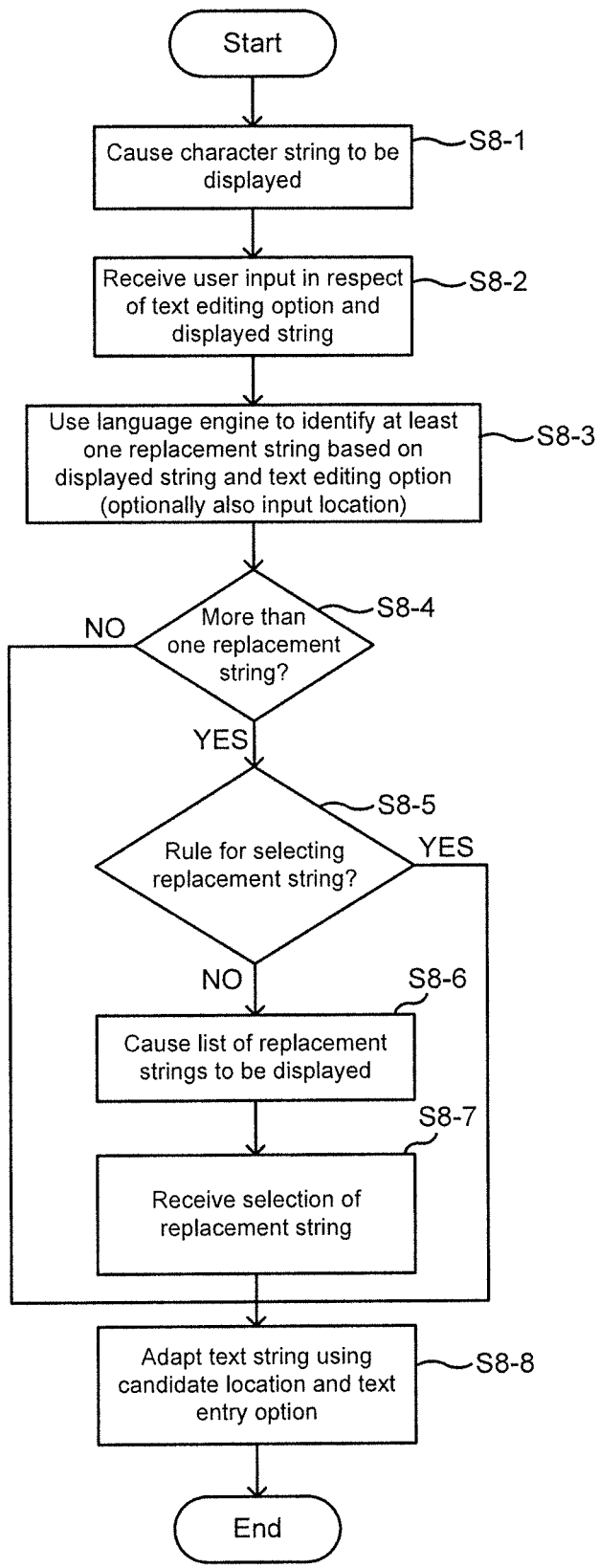
FIG. 8 is a flow chart illustrating the operation explained with reference to FIGS. 2A to 7D.

FIG. 8 is a flow diagram illustrating a method according to example embodiments.

In step, S8-1, the controller 10 causes a character string to be displayed on the display screen 14B.

Next, in step S8-2, the controller 10 receives from the user input interface 14B a signal indicative of user input having been received in respect of the displayed character string and a text editing option. This may comprise a single user input, such as a dynamic touch input with the displayed character string and the text editing option being located at either end of the dynamic touch input. Alternatively, it may comprise two discrete user inputs, one selecting the character string and the other selecting the text editing option. For example, on a device including means for moving a cursor (such as a mouse or a trackball), the user input in respect of the character string may be provided by placing the cursor at any location in the character string and the input in respect of the text editing option may be provided by subsequently pressing a mechanical key associated with that option.

In step S8-3, in response to receiving the user input(s), the controller 10 uses the language engine 16 to identify one or more replacement character strings based on the selected displayed character string, the selected text editing option, and optionally on the location of the user input within the displayed character string. In this step, the controller 10 could also be said to be predicting a location within the displayed character string at which a modification is to be made. Each replacement string is a version of the selected character string which is modified at a predicted location in accordance with the selected text editing option.

In step S8-4, the controller 10 determines if the language engine 16 has returned more than one replacement character string. If a negative determination is reached, the controller 10 proceeds to step S8-8 in which the selected displayed character string is caused to be replaced on the display screen 14A by the returned replacement character string identified by the language engine 16. If a positive determination is reached, the method proceeds to step S8-5.

In step S8-5, it is determined if a rule is in place which determines which replacement string should be returned for display. This may be determined, for example, based on the modification type (e.g. replacement or insertion), analysis of the character strings surrounding the selected string (i.e. the context) to identify a most probable replacement, or based on a determination as to which replacement string is more commonly-used.

If a positive determination is reached in step S8-5, the method proceeds to step S8-8, in which one of the replacement replacements strings is caused to be displayed in place of the selected originally displayed string. In addition to this, the controller 10 may activate a mechanism for allowing the user to scroll through the other replacement strings.

If a negative determination is reached in step S8-5, the controller 10 proceeds to step S8-6. In step S8-6, the controller 10 causes a list of two or more of the replacement strings to be displayed on the display 14. Each of the displayed replacement strings is selectable such that, when selected by a user input, the selected replacement string is caused to be displayed in place of the originally displayed character string. This list may also be scrollable, such that not all possible replacement strings are caused to be displayed simultaneously, but can be scrolled by the user.

Next, in step S7-7, the controller 10 receives a signal indicative of a selection of one of the replacement strings. Subsequently, the controller 10 proceeds to step S8-8 in which the selected replacement string is caused to be displayed on the display 14A in place of the originally displayed character string. Subsequently, the method ends.

In the above examples, where the text editing option is a text character, the replacement strings are either modified by insertion of the selected character or by replacement of a single character with by the selected character. In some examples, however, multiple existing characters may be replaced by the selected character. For example, the user may be attempting to enter the word "POP" but may accidentally double-tap the neighbouring "L" key instead of pressing the "P" key for the second time. This results in the word "POLL" being displayed. In order to correct this, the user may simply drag the "P" key onto the word and, in response, the controller 10 may replace both "L"s with a single "P".

Also, in all of the above examples, the character that is removed from the character string is replaced by the selected character at the same location. However, in some examples, a character may be removed from one location in a character string and the selected character may be inserted at a different location. For example, if a user were to drag the letter "i" onto the word "there", the controller 10, together with the language engine 16 may recognise that the user wishes to spell the word "their". As such, the final character (i.e. "e") is removed and the selected character ("i") is inserted at a different location. In some examples, the controller 10 and the language engine 16 may recognise, based on the selection of a single particular text editing option, that the user wishes to replace the displayed text string with another text string that includes the selected option but also includes other one or more other text editing options which have not been selected by the user. An example of this may be where the user wishes to correct the displayed word "their" with the word "they're". In this case, the user may select any one of the "Y", apostrophe and "E" keys and drag it onto the displayed word. In response to this, the controller 10 may cause the selected character to be inserted into the word at a suitable location, as well as causing the unwanted "I" to be deleted. In addition, the controller 10 may also automatically cause the other required characters to be displayed in the text string.

In the prior art, when correcting a mistyped or otherwise undesired word, it is often necessary to position a cursor at the desired point in the word and then to delete and/or insert characters until the word is corrected as required. Not only does this process require a number of separate user inputs, but the act of positioning a cursor, or caret, accurately in a word is not an easy one, particularly when using a small device. This difficulty is exacerbated when using touchscreen devices. The prior art offers various approaches for assisting the user in accurately positioning their cursor. These include providing a virtual magnifying lens to enlarge the area into which the caret is being inserted and reducing the sensitivity of the caret such that a large displacement of the user's finger is required in order to move the caret a small distance in a word. In any case, all of the approaches are awkward to perform and, in practice it is often quicker to partially or entirely re-enter a word than to attempt to position the caret accurately so that just the erroneous character(s) can be corrected.

In contrast to the prior art, the example operations described above with reference to FIGS. 2A to 8 provide an efficient and intuitive method whereby the user can correct words displayed on the display, regardless of whether they are correctly spelled words or "non-words". The example methods reduce the number of inputs the user is required to make and also eliminates the need for the user to carefully position the caret at the correct position in the word or to delete all or part of the word and to start again.

Figure 9A:
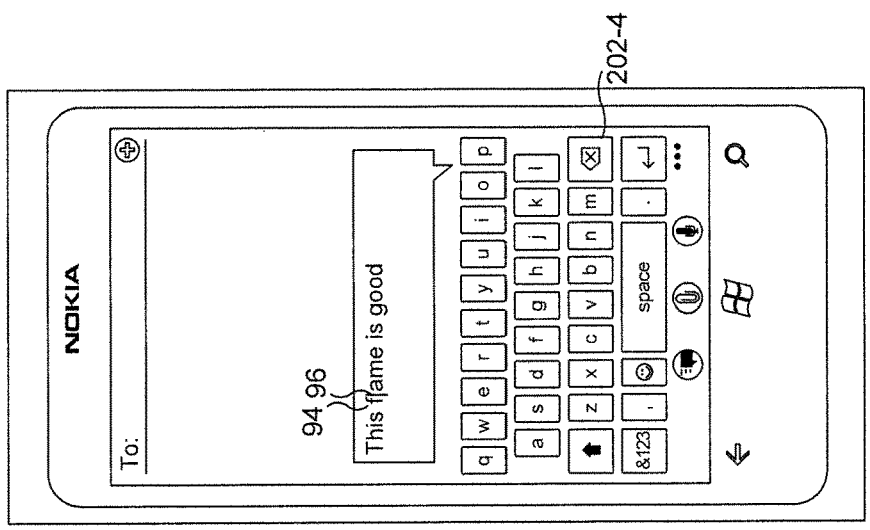
FIGS. 9A to 9C illustrate another operation according to example embodiments.
Figure 9B:
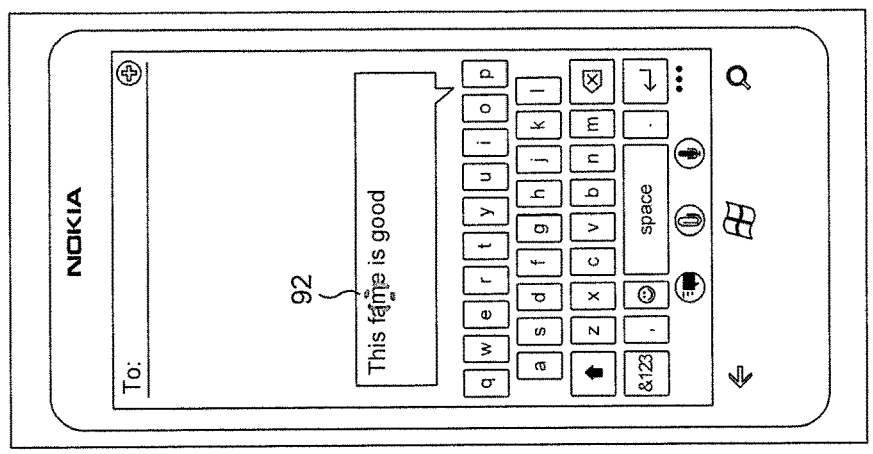
Figure 9C:
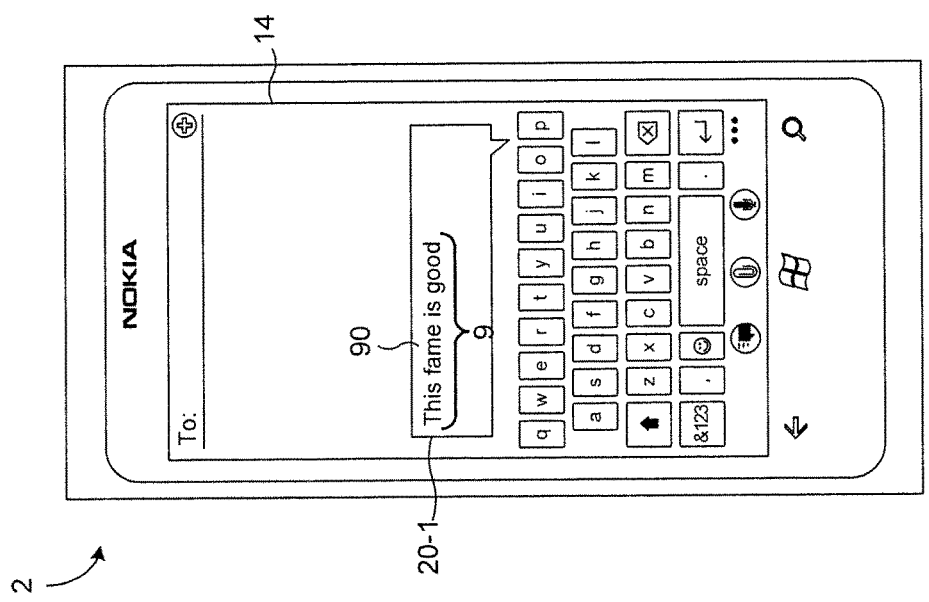

FIGS. 9A to 9C illustrate another aspect according to example embodiments.

FIG. 9A shows a series of character strings displayed on the text display region 20-1 of the display 14 of the portable device. The series of character strings ("This fame is good") includes an error. Specifically, when the user attempted to enter the word "game" they accidentally pressed the "f" key, instead of the neighbouring "g" key. This resulted in the character string "fame" 90 being displayed.

In FIG. 9B, the user provides a touch input 92 in respect of the incorrect character string (i.e. "fame") 90. In response to this touch input, the controller 10 uses the language engine 16 to identify a most probable location within the character string 90 of an error. Put another way, the language engine 16 predicts a location within the string at which a modification is likely to be made. "Within" does not necessarily imply that the location must be between two characters of the string—it may instead be at the beginning or end of the string, for example if the last character of the string is to be modified. This location may be referred to as a location for modification.

Once a location for modification has been identified, a text input cursor may be moved to that location in order to permit the user to perform a modification such as inserting one or more new characters, deleting one or more existing characters, and overwriting one or more existing characters.

The location for modification may be determined by comparing the selected character string with other strings in a database (or dictionary) of the language engine 16, and looking for similar strings that differ by one or more characters from the selected character string. The location of one character from the one or more differing characters may then be taken as the most probable location of an error and therefore set as the location for modification. Where one or more characters differ, one character may be selected based on any suitable approach, for example selecting the first differing character in the string, or the character that appears to be the most likely to be corrected based on historical correction data or knowledge of common errors due to the input method (e.g. common swap errors of adjacent keys in keyboards, or common recognition errors between similarly shaped characters in optical character recognition or handwriting recognition).

Similarly, historical or otherwise modelled data may be used to select the most likely error location. For example, if the user commonly mistypes the character "O" as "P" using a Qwerty keyboard then the location for modification may be set as the location of a letter "O" occurring in the selected character string. Similarly, a confidence level may be applied to text input and the location for modification determined to be the character with the lowest confidence value: for example the key pressed furthest away from its centre in a touch keyboard, or the character that was most difficult to recognise using optical or character recognition.

The historical data may also relate to prior modifications made by the user. For example, if a user has previously often modified the character string "boat" to "boot" then based on this historical data the location of the "a" in "boat" may be determined to be the most likely error location and therefore set as the location for modification.

The exact method used to determine the location for modification may comprise any one or more of the above approaches, used either alone or in combination with any other. Any other suitable approach may be used.

In some examples, the apparatus 1 may be configured to predict the most probable location of an error based upon a location within the displayed character string at which the user input is incident. As mentioned above, the controller 10 may divide the character string up in to sub-portions. When a touch input is incident on a character string, the controller to identifies the sub-portion upon which the touch input was incident. In such examples, only locations within the identified sub-portion are considered when predicting the most probable location of the error Subsequent to predicting the location within the character string, the controller 10 causes a text editing cursor, or a caret, 96 to be displayed at that location. In instances in which the location is determined to be the location of a character (i.e. that modification by deletion as well as insertion is required), the cursor is placed to one side of that character. This can be seen in FIG. 9C, in which a cursor 96 is placed immediately after the character "f" 94. The user is then able to delete the incorrect character with a single key press (e.g. the backspace key 202-4) and subsequently to select the correct character.

Figure 10:
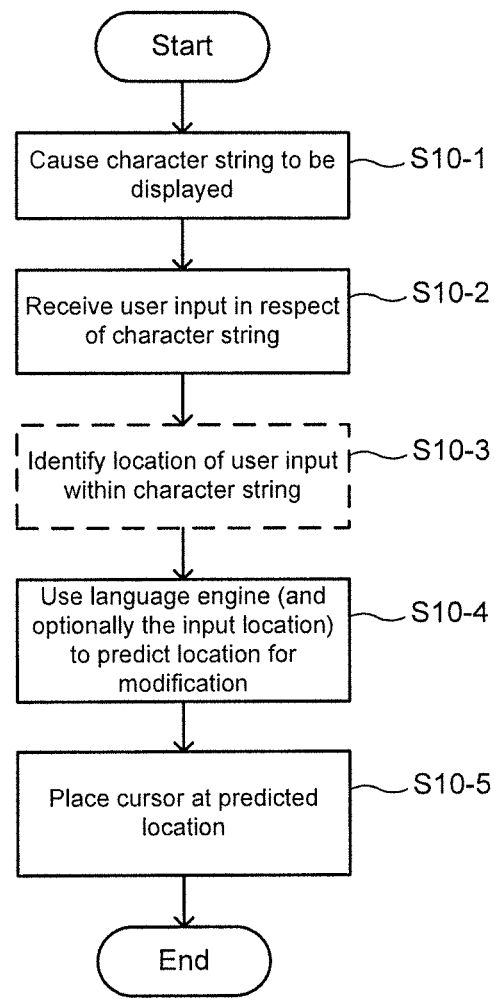
FIG. 10 is a flow chart illustrating the operation explained with reference to FIGS. 9A to 9C.

FIG. 10 is a flow chart illustrating the example method of FIGS. 9A to 9C.

First, in step S10-1, the controller to causes a character string to be displayed on the display 14A.

In step S10-2, the controller to receives from the user input interface 14B a signal indicative of the user input having been received in respect of the displayed character string. In a touchscreen device, the user input may comprise a touch input incident on the region of the screen at which the character string is located. In "point and click" type of device, such as one including a mouse, the input may be provided by "clicking" on a location at which character string is displayed.

Optionally, in step S10-3, the controller to identifies sub-portion of the character string on which the user input was incident. Put another way, the controller to identifies a location within the character string at which the user input was provided.

Subsequently, in Step S10-4, the controller to uses the language engine 16 to predict (or identify) a location for modification (or a most probable location of an error). This may be carried out as described above with reference to FIGS. 9A to 9C.

Finally, in step S10-5, the user causes the text editing cursor 96, or caret, to be provided at a location within the character string based on the predicted location. Subsequent to this, the method finishes.

It will of course be appreciated that, although the methods of FIGS. 8 and 10 have been described separately, the apparatus 1 according to example embodiments may be configured to perform both methods. For example, the apparatus 1 may be configured to respond to a dynamic touch input from a text editing option to a character string to correct automatically the incorrect word (as described with reference to FIGS. 2A to 5C and 7A to 8) or to provide plural selectable replacement words (as described with reference to FIGS. 6A to 6C and 8). If a single static touch input is provided to the character string, the apparatus may respond by causing the cursor or caret 96 to be displayed at a predicted location within the character string.

The example operations described with reference to FIGS. 9A to 9C and 10 utilise the language engine 16 to remove the need for the user to carefully position the caret when correcting previously entered text strings. Furthermore, in examples, in which the location of the user input within the character string is taken into account, the operations may be invisible to the user who simply assumes that they have placed the caret correctly at the first attempt.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
   causing a character string to be displayed on a display, the character string being a word recognized as being spelled correctly;
   receiving a signal indicative of user input for selecting and allowing for modifying of the displayed character string;
   responding to the signal by using a language engine to predict a most probable location of an error within the selected character string; and
   positioning a cursor within the selected character string based on the predicted most probable location of an error to allow for modification of the selected character string.

2. The method of claim 1, comprising using the language engine to predict the location for modification of the selected character string based on the selected character string and a location of the user input within the selected character string.

3. The method of claim 1, further comprising receiving a signal indicative of user input in respect of a selection of a text editing option.

4. The method of claim 3, wherein the user input for selecting the displayed character string comprises a dynamic touch input which identifies both a location of an object representing the selected text editing option and the selected character string.

5. The method of claim 4, wherein the selected text editing option is a text character, wherein each replacement character string is modified by inserting the selected text character into the selected displayed character string at a predicted location.

6. The method of claim 5, wherein each replacement character string is modified also by removing a character from the string.

7. The method of claim 4, wherein the text editing option is a character removal option.

8. The method of claim 7, wherein each identified replacement character string is modified by removing a text character from the predicted location in the selected displayed character string.

9. The method of claim 3, wherein using the language engine to predict the location comprises identifying a replacement character string based on the selected character string and the selected text editing option, wherein the replacement character string is a version of the selected character string that is modified at the predicted location based on the selected text editing option.

10. The method of claim 9, comprising subsequently causing the selected character string to be replaced on the display by the replacement character string.

11. The method of claim 9, wherein predicting the location for modification comprises identifying plural different replacement character strings based on the selected character string and the selected text editing option, each of the different replacement strings being a version of the selected character string that is modified at a different location based on the selected text editing option.

12. The method of claim 11, comprising activating a mechanism for allowing the user to select one of the plural replacement character strings; and responding to selection of one of the replacement character strings by causing the selected displayed character string to be replaced on the display by the selected replacement character string.

13. The method of claim 1, wherein the signal is indicative of user input made in respect of the character string of the word recognized as being spelled correctly by one of a touch input or point-and-click input.

14. The method of claim 1, wherein the location of the user input within a portion of the character string is used to predict the most probable location of an error.

15. The method of claim 1, wherein the language engine predicts the most probable location within the selected character string by one or more of:
   comparing the selected character string with other character strings in a database of character strings and identifying character strings in the database which differ from the selected character string by one or more characters, the most probable location predicted as the location of one of the one or more characters;
   using historical or modeled data to identify the most probable location of an error; or
   applying a confidence level to text input made to enter the character string and predicting the most probable location on a character string with the lowest confidence level.

16. Apparatus comprising at least one processor and at least one non-transitory memory including computer program code, the at least one memory and the computer program code configured to, with the at least one processor, cause the apparatus:
   to cause a character string to be displayed on a display, the character string being a word recognized as being spelled correctly;
   to receive a signal indicative of user input for selecting and allowing for modifying of the displayed character string;
   to respond to the signal by using a language engine to predict a location within the selected character string; and
   to position a cursor within the selected character string based on the predicted most probable location of an error to allow for modification of the selected character string.

17. The apparatus of claim 16, wherein the at least one memory and the computer program code are configured, with the at least one processor, to cause the apparatus: to use the language engine to predict the location for modification of the selected character string based on the selected character string and a location of the user input within the selected character string.

18. The apparatus of claim 16, wherein the at least one memory and the computer program code are configured, with the at least one processor, to cause the apparatus: receive a signal indicative of user input in respect of a selection of a text editing option.

19. The apparatus of claim 17, wherein the at least one memory and the computer program code are configured, with the at least one processor, to cause the apparatus: subsequent to predicting the location for modification, to position a cursor within the selected character string based on the predicted location.

20. The apparatus of claim 18, wherein the user input for selecting the displayed character string comprises a dynamic touch input which identifies a location of an object representing the selected text editing option and the selected character string.

21. The apparatus of claim 18, wherein the at least one memory and the computer program code are configured, with the at least one processor, to cause the apparatus: to use the language engine to predict the location by identifying a replacement character string based on the selected character string and the selected text editing option, wherein the replacement character string is a version of the selected character string that is modified at the predicted location based on the selected text editing option.

22. The apparatus of claim 21, wherein the at least one memory and the computer program code are configured, with the at least one processor, to cause the apparatus: subsequently to cause the selected character string to be replaced on the display by the replacement character string.

23. The apparatus of claim 21, wherein the at least one memory and the computer program code are configured, with the at least one processor, to cause the apparatus: to predict the location for modification by identifying plural different replacement character strings based on the selected character string and the selected text editing option, each of the different replacement strings being a version of the selected character string that is modified at a different location based on the selected text editing option.

24. The apparatus of claim 23, wherein the at least one memory and the computer program code are configured, with the at least one processor, to cause the apparatus: to activate a mechanism for allowing the user to select one of the plural replacement character strings; and to respond to selection of one of the replacement character strings by causing the selected displayed character string to be replaced on the display by the selected replacement character string.

25. The apparatus of claim 24, wherein each replacement character string is modified also by removing a character from the string.

26. The apparatus of claim 18, wherein the selected text editing option is a text character.

27. The apparatus of claim 26, wherein each replacement character string is modified by inserting the selected text character into the selected displayed character string at a predicted location.

28. The apparatus of any of claim 18, wherein the text editing option is a character removal option.

29. The apparatus of claim 28, wherein each identified replacement character string is modified by removing a text character from the predicted location in the selected displayed character string.

30. At least one non-transitory computer readable memory medium having computer readable instructions stored thereon, the computer readable instructions, when executed by at least one processor, causing the at least one processor:
- to cause a character string to be displayed on a display, the character string being a word recognized as being spelled correctly;
- to receive a signal indicative of user input for selecting and allowing for modifying of the displayed character string;
- to respond to the signal by using a language engine to predict a most probable location of an error within the selected character string; and
- to position a cursor within the selected character string based on the predicted most probable location of an error to allow for modification of the selected character string.

* * * * *